(12) United States Patent
Chen et al.

(10) Patent No.: US 8,446,129 B2
(45) Date of Patent: May 21, 2013

(54) DIGITAL FLASH CHARGER CONTROLLER

(75) Inventors: Pei Hsin Chen, Hsinchu County (TW); Yueh Chang Chen, Hsinchu (TW)

(73) Assignee: Altek Corporation, Hsinchu (TW)

( * ) Notice: Subject to any disclaimer, the term of this patent is extended or adjusted under 35 U.S.C. 154(b) by 475 days.

(21) Appl. No.: 12/905,628

(22) Filed: Oct. 15, 2010

(65) Prior Publication Data
US 2012/0091945 A1 Apr. 19, 2012

(51) Int. Cl.
*H02J 7/04* (2006.01)
(52) U.S. Cl.
USPC ............ 320/141; 302/107; 302/140; 302/145
(58) Field of Classification Search
USPC .......................................................... 320/141
See application file for complete search history.

(56) References Cited

U.S. PATENT DOCUMENTS

2008/0192517 A1* 8/2008 Lin et al. ........................... 363/52
2010/0103575 A1* 4/2010 Chuang et al. ................... 361/79

* cited by examiner

*Primary Examiner* — Edward Tso
*Assistant Examiner* — Johali Torres Ruiz
(74) *Attorney, Agent, or Firm* — Morris Manning & Martin LLP; Tim Tingkang Xia, Esq.

(57) ABSTRACT

A digital flash charger controller includes a transformer, a power supply element, and an application-specific integrated circuit (ASIC). A secondary side of the transformer is electrically connected to an energy storage device, and the power supply element is used to supply an electric power to a primary side of the transformer. The ASIC outputs a pulse-width-modulation (PWM) signal to control whether the electric power is input to the primary side, and the ASIC converts a sensing signal generated at the secondary side of the transformer to a digital signal, and tracks a sensing negative edge of the sensing signal according to the digital signal to adjust a cutoff time of the PWM signal, such that the next pulse positive edge approaches the corresponding sensing negative edge.

7 Claims, 10 Drawing Sheets

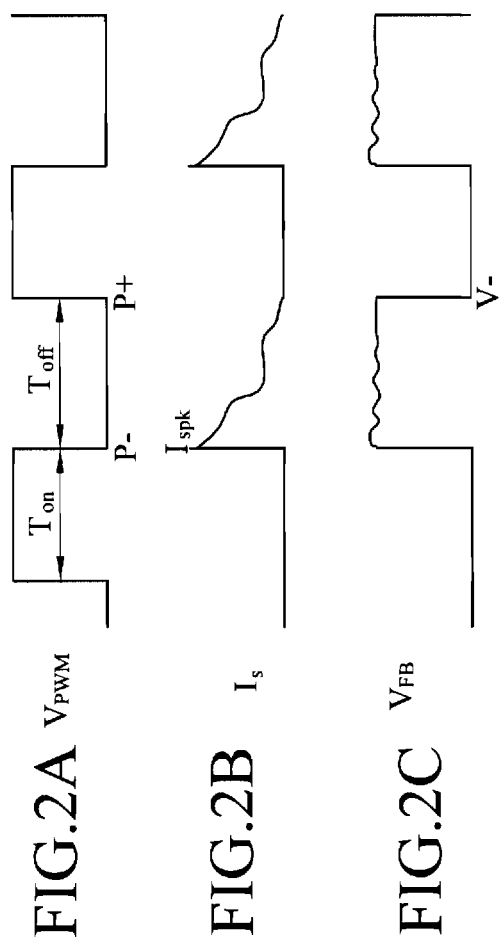

US 8,446,129 B2

DIGITAL FLASH CHARGER CONTROLLER

BACKGROUND OF THE INVENTION

1. Field of the Invention

The present invention relates to a flash light charging circuit, and more particularly to a digital flash charger controller capable of enabling a pulse positive edge to approach a sensing negative edge.

2. Related Art

For a recently common charging circuit, a power supply is combined with a transformer in most cases, and an adjusting device is disposed at a primary side of the transformer, so as to adjust an output current and complete the charging and discharging function of the circuit at the same time. In the recent design field, in most cases, a designer selects to dispose a charging integrated chip (IC) at the primary side of the transformer, so as to implement the charging circuit.

A conventional method is mainly to use the charging IC to form the charging circuit, and use analog elements for voltage and current measurements. Therefore, the method is easily affected by noises, resulting in distortion of measured data. Furthermore, the charging IC, and resistors, capacitors, and other passive elements required to be arranged at measure points occupy quite a large area and consume large numbers on a circuit board. Based on the above, for a circuit for charging and discharging a flash light by using the charging IC, the operational complexity is high, and the fabrication cost and working performance are worth being considered.

SUMMARY OF THE INVENTION

In view of the above, the present invention is a digital flash charger controller, which can not only solve the problem in the prior art that when analog elements are used for voltage and current measurements, the measured data is easily affected by noises, resulting in distortion, but also can replace the conventional charging IC with a logic circuit, so as to reduce the number of used elements and area consumption on a circuit board.

The present invention provides a digital flash charger controller, configured to charge an energy storage device. The digital flash charger controller comprises a transformer, a power supply element, and an application-specific integrated circuit (ASIC). The transformer has a primary side and a secondary side, in which the secondary side is electrically connected to the energy storage device. The power supply element is used to output an electric power. The ASIC is used to output a pulse-width-modulation (PWM) signal to control whether the electric power is input to the primary side. The PWM signal has a pulse positive edge and a cutoff time. A sensing signal is generated at the secondary side in response to the primary side, and the sensing signal has a sensing negative edge. The ASIC converts the sensing signal to a digital signal, and tracks the sensing negative edge according to the digital signal to adjust the cutoff time, and the next pulse positive edge approaches the corresponding sensing negative edge.

Therefore, in the digital flash charger controller according to the present invention, the ASIC can be used to modulate the cutoff time of the PWM signal, such that the next pulse positive edge of the PWM signal approaches the corresponding sensing negative edge, thereby achieving a high charging and discharging efficiency.

BRIEF DESCRIPTION OF THE DRAWINGS

The present invention will become more fully understood from the detailed description given herein below for illustration only, and thus are not limitative of the present invention, and wherein:

FIGS. 2A to 2C are respectively waveform diagrams according to an embodiment of the present invention;

DETAILED DESCRIPTION OF THE INVENTION

Figure 1:
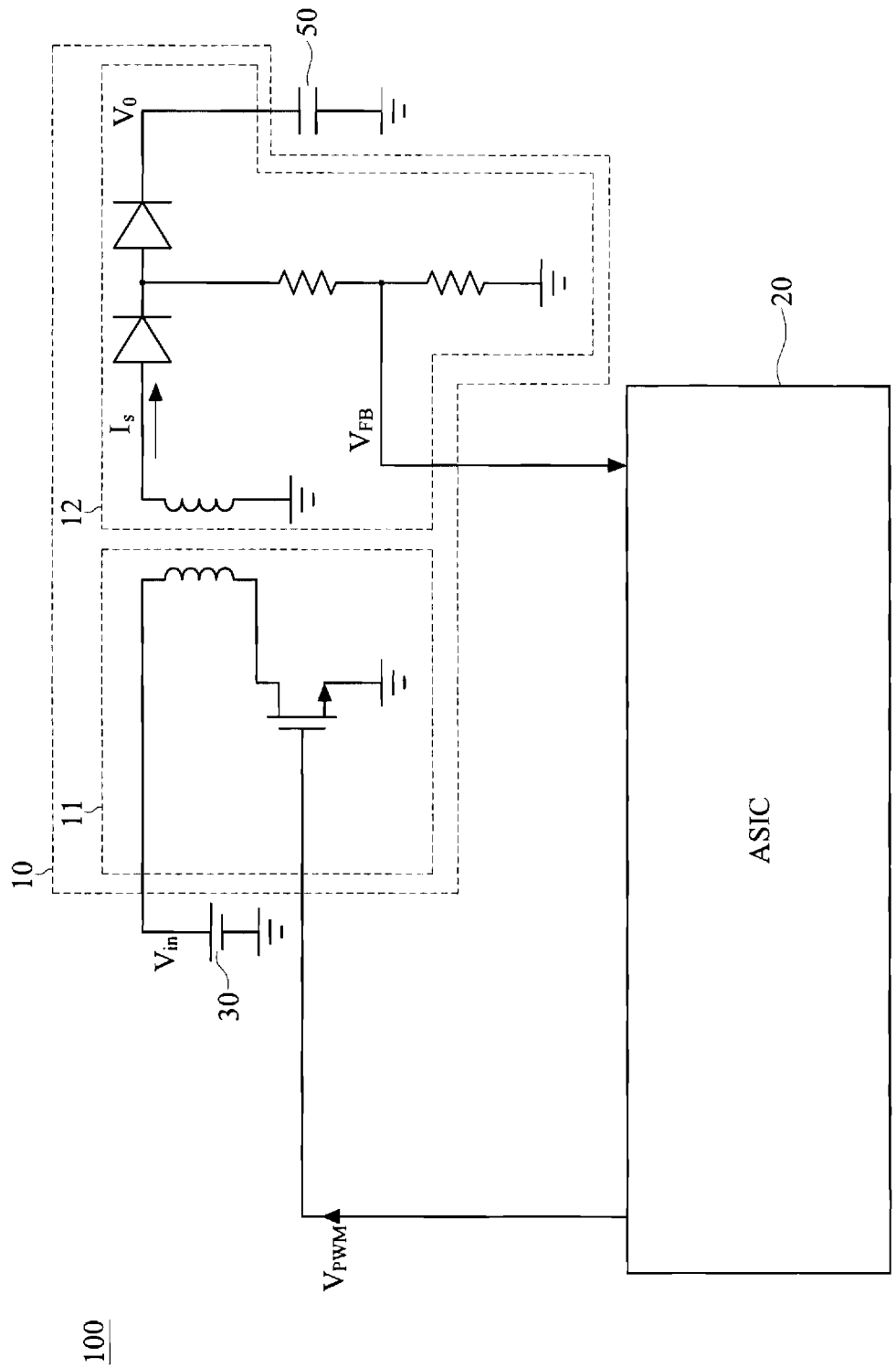
FIG. 1 shows a digital flash charger controller according to an embodiment of the present invention.

FIG. 1 shows a digital flash charger controller according to an embodiment of the present invention. Referring to FIG. 1, the digital flash charger controller 100 comprises a transformer 10, an ASIC 20, and a power supply element 30. The power supply element 30 is connected to a primary side 11 of the transformer 10, the power supply element 30 supplies an input voltage $V_{in}$ (or called an electric power), and the transformer 10 transforms the input voltage and outputs an output voltage $V_o$ through a secondary side 12 thereof. The secondary side 12 is connected to an energy storage device, and charges the energy storage device through the input voltage $V_{in}$, supplied by the power supply element 30. For example, the energy storage device may be a capacitor 50 as shown in FIG. 1.

The ASIC 20 is disposed between the primary side 11 and the secondary side 12, and is used to generate a PWM signal $V_{PWM}$ to control whether the input voltage $V_{in}$ is input to the primary side 11. According to an embodiment of the present invention, the capacitor 50 is further connected to a flash light, such that the digital flash charger controller 100 charges the flash light.

Referring to FIGS. 2A to 2C, when the PWM signal $V_{PWM}$ is just switched to a low level, a secondary-side switching current $I_s$ has a maximum secondary-side switching current value $I_{spk}$, and at this time, a sensing signal $V_{FB}$ is formed at the secondary side 12 of the transformer 10 in response to the secondary-side switching current $I_s$. When the secondary-side switching current $I_s$ gradually decreases along with the charging time of the capacitor 50 (that is, the time during which the PWM signal $V_{PWM}$ is at the low level), and the secondary-side switching current $I_s$ finally returns to zero, the sensing signal $V_{FB}$ gradually disappears, which is defined as a sensing negative edge V– of the sensing signal $V_{FB}$.

Therefore, a time point at which the PWM signal $V_{PWM}$ is switched from the low level to a high level is a pulse positive edge P+, a time point at which the PWM signal $V_{PWM}$ is switched from the high level to the low level is a pulse negative edge P–, and the PWM signal $V_{PWM}$ has a working time $T_{on}$ and a cutoff time $T_{off}$. The working time $T_{on}$ and the cutoff time $T_{off}$ are respectively time intervals in which the PWM signal $V_{PWM}$ is at the high level and the low level.

Figure 3A:
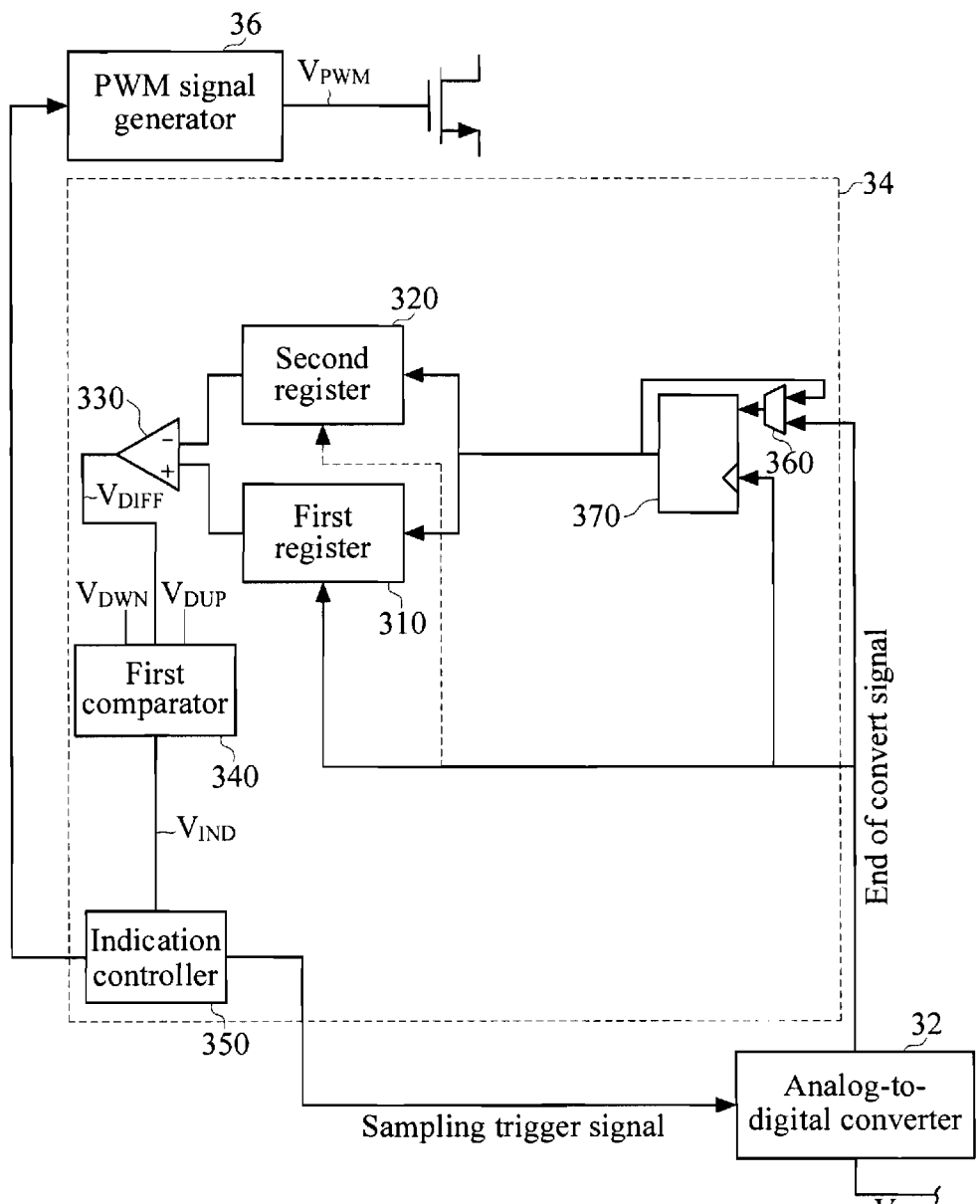
FIG. 3A shows an ASIC according to a first embodiment of the present invention.

Referring to FIG. 3A, the ASIC 20 comprises an analog-to-digital converter 32, a PWM controller 34, and a PWM signal generator 36. The analog-to-digital converter 32 is used to convert the sensing signal $V_{FB}$ to a digital signal, sample the sensing signal $V_{FB}$, and respectively output the digital signal along with different sampling time points.

According to a first embodiment of the present invention, the PWM controller 34 comprises a first register 310, a second register 320, a differentiator 330, a first comparator 340, an indication controller 350, and a multiplexer 360 and a flip-flop 370 connected between the first register 310 and second register 320 and the analog-to-digital converter 32.

Figure 4A:
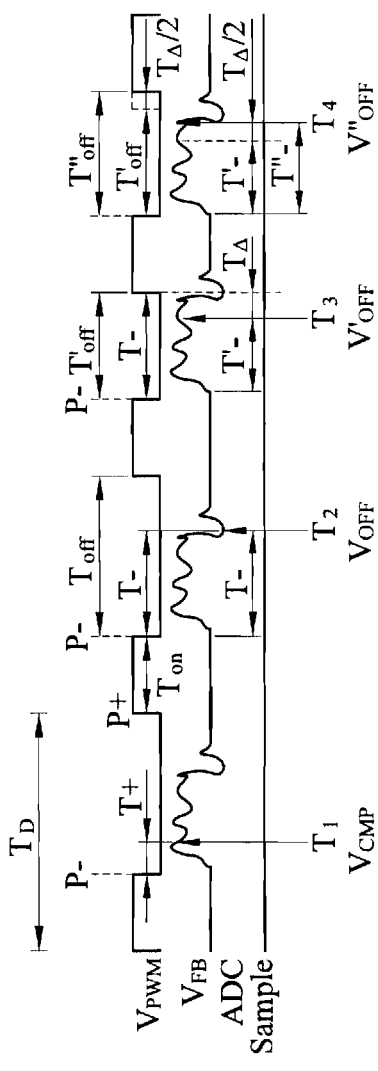
FIG. 4A is a schematic view of sampling according to the first embodiment of the present invention.

As shown in FIG. 4A, a user may previously set a positive edge sampling time T+ and a negative edge sampling time T– through software before operations, such that the indication controller 350 triggers sampling at a first sampling time point $T_1$, that is, a positive edge sampling time T+ after the pulse negative edge P– of the PWM signal $V_{PWM}$.

Next, after the PWM signal $V_{PWM}$ finishes the on-going duty cycle $T_D$, and reaches the pulse positive edge P+, the working time $T_{on}$, and the pulse negative edge P– again, the indication controller 350 triggers sampling at a second sampling time point $T_2$, a negative edge sampling time T– after the pulse negative edge P–.

Digital signals obtained at the two sampling time points are respectively a component signal $V_{CMP}$ and an offset signal $V_{OFF}$. The differentiator 330 is used to obtain a difference value between the component signal $V_{CMP}$ and the offset signal $V_{OFF}$, and output a differential signal $V_{DIFF}$. The first comparator 340 is used to compare the differential signal $V_{DIFF}$ with a maximum tolerance signal $V_{DUP}$ and a minimum tolerance signal $V_{DWN}$.

Figures 5A, 5B:
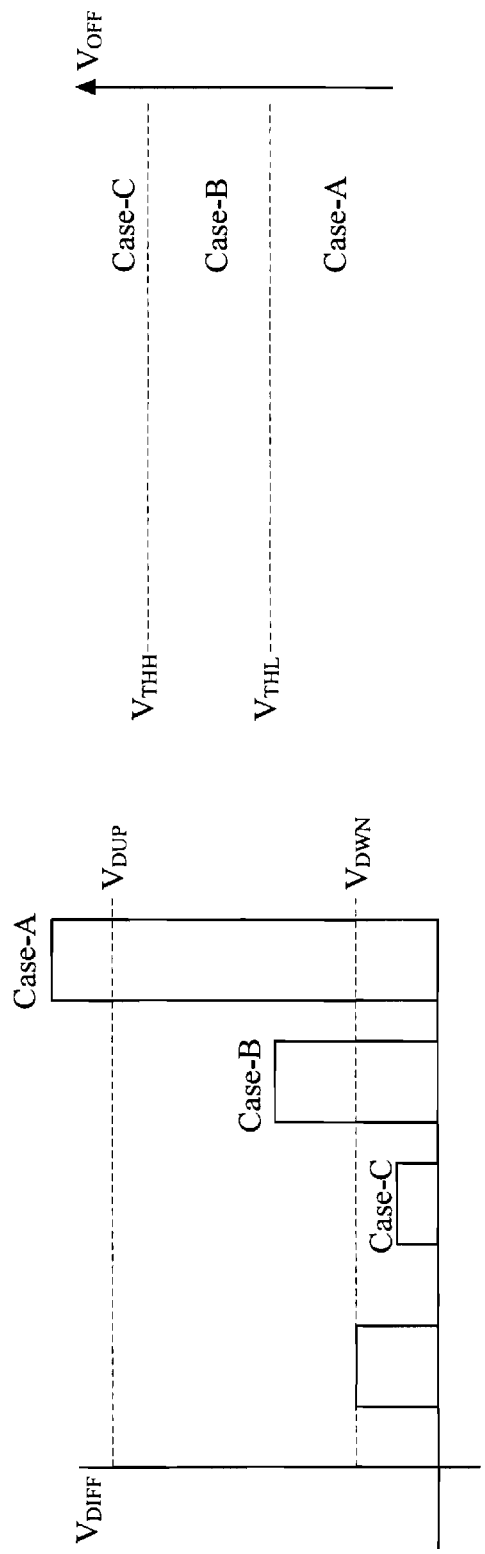
FIG. 5A is a data comparison reference diagram of sampling methods according to the first embodiment and the second embodiment of the present invention.
FIG. 5B is a data comparison reference diagram of sampling methods according to the third embodiment and the fourth embodiment of the present invention.

As shown in FIG. 5A, when the differential signal $V_{DIFF}$ is larger than the maximum tolerance signal $V_{DUP}$ (that is, Case-A in the figure), the first comparator 340 outputs a hit indication signal $V_{IND}$, that is, the offset signal $V_{OFF}$ sampled by the analog-to-digital converter 32 is a low-level value of the sensing signal $V_{FB}$. Therefore, the indication controller 350 updates the negative edge sampling time T– and the cutoff time $T_{off}$ according to the hit indication signal $V_{IND}$. Here, according to the first embodiment of the present invention, as shown in FIG. 4A, the next negative edge sampling time T'– is one modulation time interval $T_A$ shorter than the previous negative edge sampling time T–. The cutoff time $T'_{off}$ of the PWM signal $V_{PWM}$ is equal to the previous negative edge sampling time T–.

Similarly, the analog-to-digital converter 32 performs sampling at a third sampling time point $T_3$, the negative edge sampling time T'– after the pulse negative edge P–. If at this time, as shown in FIG. 5A, the differential signal $V_{DIFF}$ is smaller than the minimum tolerance signal $V_{DWN}$ (that is, Case-C in the figure), the indication signal $V_{IND}$ output by the first comparator 340 is not-hit, that is, the offset signal $V'_{OFF}$ sampled by the analog-to-digital converter 32 at the third sampling time point $T_3$ is a high-level value of the sensing signal $V_{FB}$. Therefore, the indication controller 350 updates the negative edge sampling time T– and the cutoff time $T_{off}$ again according to the not-hit indication signal $V_{IND}$. Here, as shown in FIG. 4A, the next negative edge sampling time T'''– is half a modulation time interval $T_A$ longer than the previous negative edge sampling time T'–. The cutoff time $T'''_{off}$ of the PWM signal $V_{PWM}$ is half a modulation time interval $T_A$ longer than the previous cutoff time $T_{off}$.

Figure 4B:
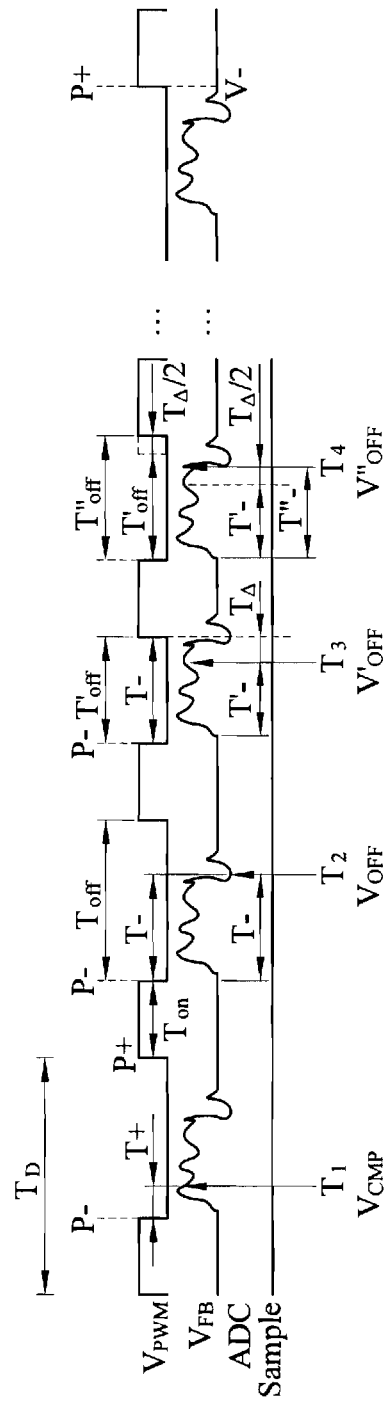
FIG. 4B is a schematic view of a pulse positive edge approaching a sensing negative edge according to FIG. 4A.

Next, the signal processing procedure is performed again based on the offset signal $V'''_{OFF}$ obtained by the analog-to-digital converter 32 at the fourth sampling time point $T_4$, such that the indication controller 350 successively modulates and updates the cutoff time $T_{off}$ of the PWM signal $V_{PWM}$ and the negative edge sampling time T– according to the hit or not-hit indication signal $V_{IND}$. Since the modulation time interval $T_A$ may previously be set through software, and is successively halved and decreased along with the time, the user may determine through software in advance that the modulation time interval $T_A$ is decreased to a lower limit value within a certain time. As the modulation time interval $T_A$ is successively decreased and converged each time, as shown in FIG. 4B, the pulse positive edge P+ of the PWM signal $V_{PWM}$ finally approaches the sensing negative edge V– of the sensing signal $V_{FB}$ generated after the previous cutoff time $T_{off}$, and the duty cycle $T_D$ of the PWM signal $V_{PWM}$ is also fixed, and the ASIC 20 according to the embodiment of the present invention continues to track the sensing negative edge V– of the sensing signal $V_{FB}$ till the position of the sensing negative edge V– of the sensing signal $V_{FB}$ is changed.

Figure 3B:
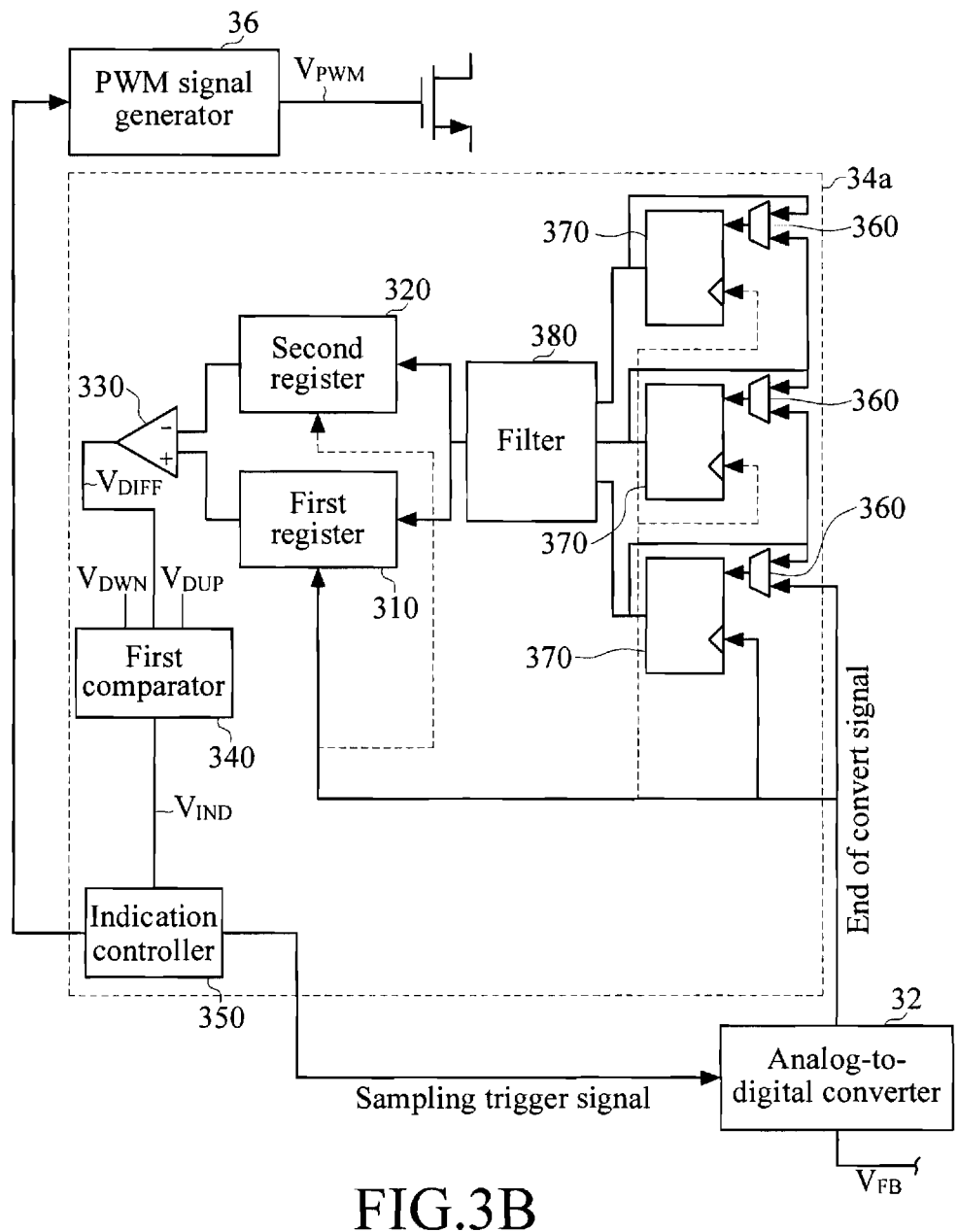
FIG. 3B shows an ASIC according to a second embodiment of the present invention.

In addition, in order to increase the data accuracy, the PWM controller 34 further comprises more than one multiplexer 360 and flip-flop 370, and a filter 380. FIG. 3B shows an ASIC according to a second embodiment of the present invention. Referring to FIG. 3B, the PWM controller 34a comprises a first register 310, a second register 320, a differentiator 330, a first comparator 340, an indication controller 350, and a filter 380, multiplexers 360 and flip-flops 370 connected between the first register 310 and second register 320 and the analog-to-digital converter 32.

Figure 3C:
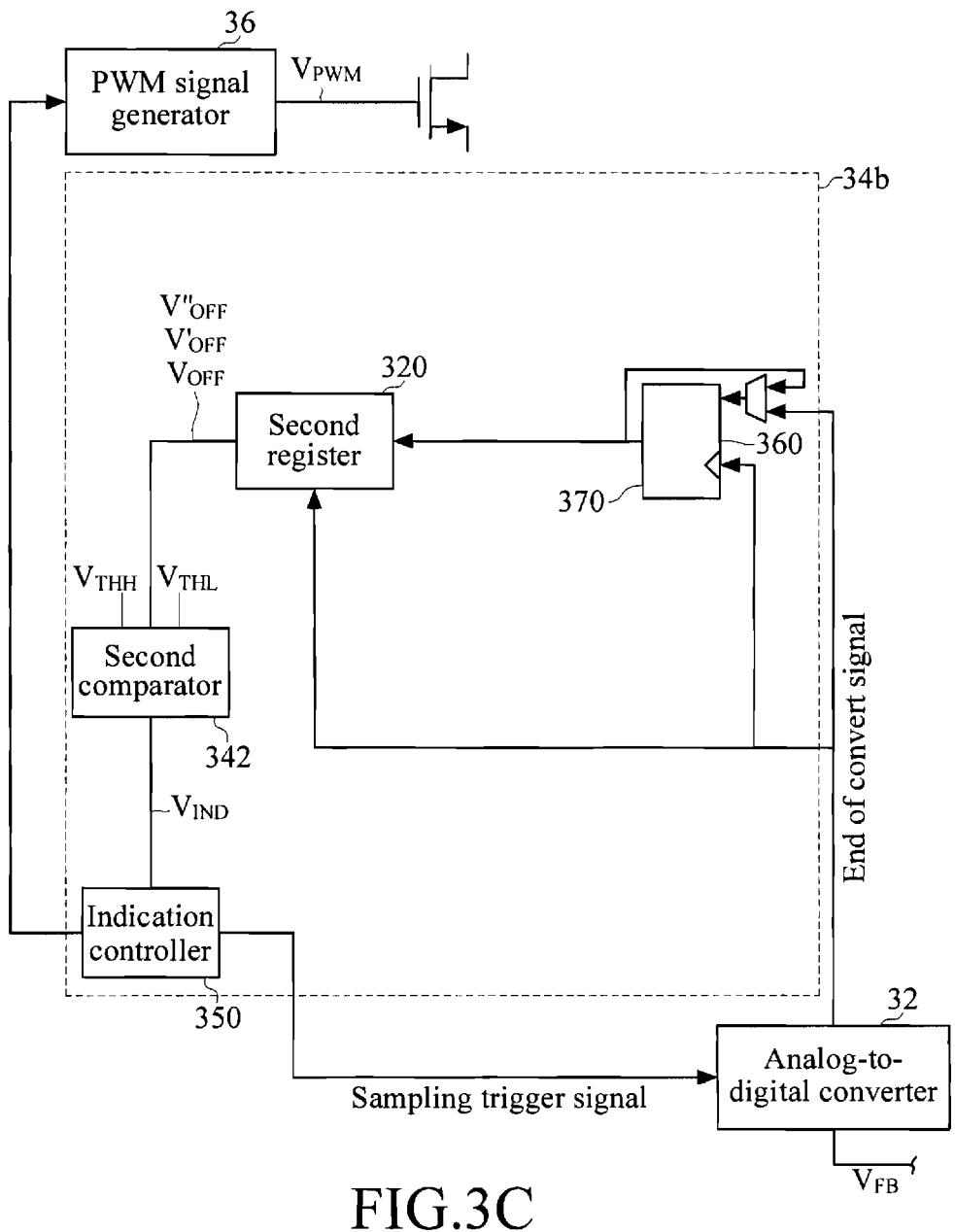
FIG. 3C shows an ASIC according to a third embodiment of the present invention.

Furthermore, in an ASIC according to a third embodiment of the present invention, as shown in FIG. 3C, the PWM controller 34b comprises a second register 320, a second comparator 342, an indication controller 350, and a multiplexer 360 and a flip-flop 370 connected between the second register 320 and the analog-to-digital converter 32.

Figure 4C:
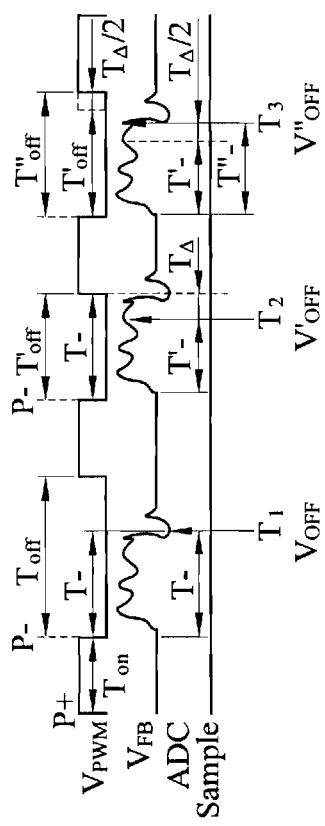
FIG. 4C is a schematic view of sampling according to the third embodiment of the present invention.

Referring to FIG. 4C, the user may previously set a negative edge sampling time T– through software, so as to ensure that the analog-to-digital converter 32 samples a low-level value of the sensing signal $V_{FB}$ at the first sampling time point $T_1$.

The digital signal obtained by the analog-to-digital converter 32 at the first sampling time point $T_1$ is the offset signal $V_{OFF}$, and the offset signal $V_{OFF}$ may be stored in the second register 320 after being triggered by an end of convert signal in FIG. 3C. The second comparator 342 is used to compare the offset signal $V_{OFF}$ with a maximum critical signal $V_{THH}$ and a minimum critical signal $V_{THL}$.

As shown in FIG. 5B, when the offset signal $V_{OFF}$ is smaller than the minimum critical signal $V_{THL}$ (that is, Case-A in the figure), the second comparator 342 outputs the hit indication signal $V_{IND}$. Therefore, the indication controller 350 updates the negative edge sampling time T– and the cutoff time $T_{off}$ according to the hit indication signal $V_{IND}$. Here, as shown in FIG. 4C, the next negative edge sampling time T'– is one modulation time interval $T_A$ shorter than the previous negative edge sampling time T–. The cutoff time $T'_{off}$ of the PWM signal $V_{PWM}$ is equal to the previous negative edge sampling time T–.

Similarly, the analog-to-digital converter 32 performs sampling at the second sampling time point $T_2$, the negative edge sampling time T'− after the pulse negative edge P−. Here, the offset signal $V_{OFF}$ sampled by the analog-to-digital converter 32 is stored in the second register 320 after being triggered by the end of convert signal. Then, referring to FIG. 5B, if the second comparator 342 compares that the offset signal V'$_{OFF}$ sampled by the analog-to-digital converter 32 at the second sampling time point $T_2$ is larger than the maximum critical signal $V_{THH}$ (that is, Case-C in the figure), the second comparator 342 outputs the not-hit indication signal $V_{IND}$. Therefore, the indication controller 350 updates the negative edge sampling time T− and the cutoff time $T_{off}$ according to the not-hit indication signal $V_{IND}$. Here, the next negative edge sampling time T"− is half a modulation time interval $T_A$ longer than the previous negative edge sampling time T'−. The cutoff time T'$_{off}$ of the PWM signal $V_{PWM}$ is half a modulation time interval $T_A$ longer than the previous cutoff time T"$_{off}$.

Next, the offset signal V"$_{OFF}$ obtained by the analog-to-digital converter 32 at the third sampling time point $T_3$ is stored in the second register 320, and then is compared by the second comparator 342 with the maximum critical signal $V_{THH}$ and the minimum critical signal $V_{THL}$. The cutoff time $T_{off}$ of the PWM signal $V_{PWM}$ and the negative edge sampling time T− are successively modulated and updated according to the hit or not-hit indication signal $V_{IND}$ output by the second comparator 342.

Figure 4D:
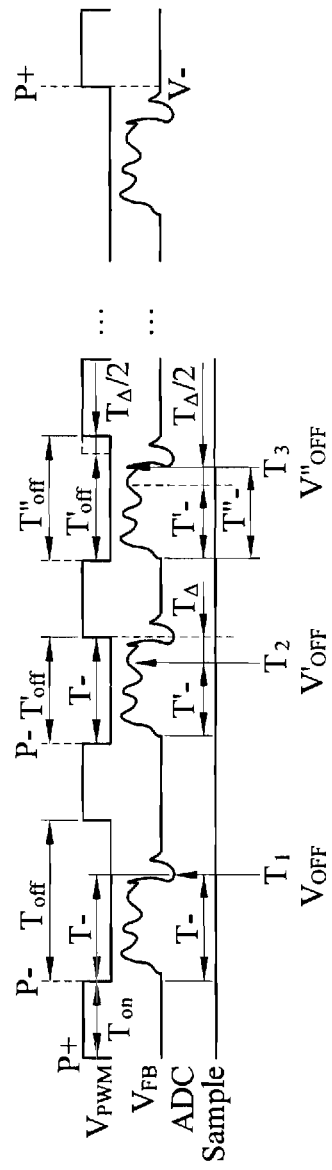
FIG. 4D is a schematic view of a pulse positive edge approaching a sensing negative edge according to FIG. 4C.

As the modulation time interval $T_A$ is successively decreased and converged each time, as shown in FIG. 4D, the pulse positive edge P+ of the PWM signal $V_{PWM}$ finally approaches the sensing negative edge V− of the sensing signal $V_{FB}$ generated after the previous cutoff time $T_{off}$, and the duty cycle $T_D$ of the PWM signal $V_{PWM}$ is also fixed.

Figure 3D:
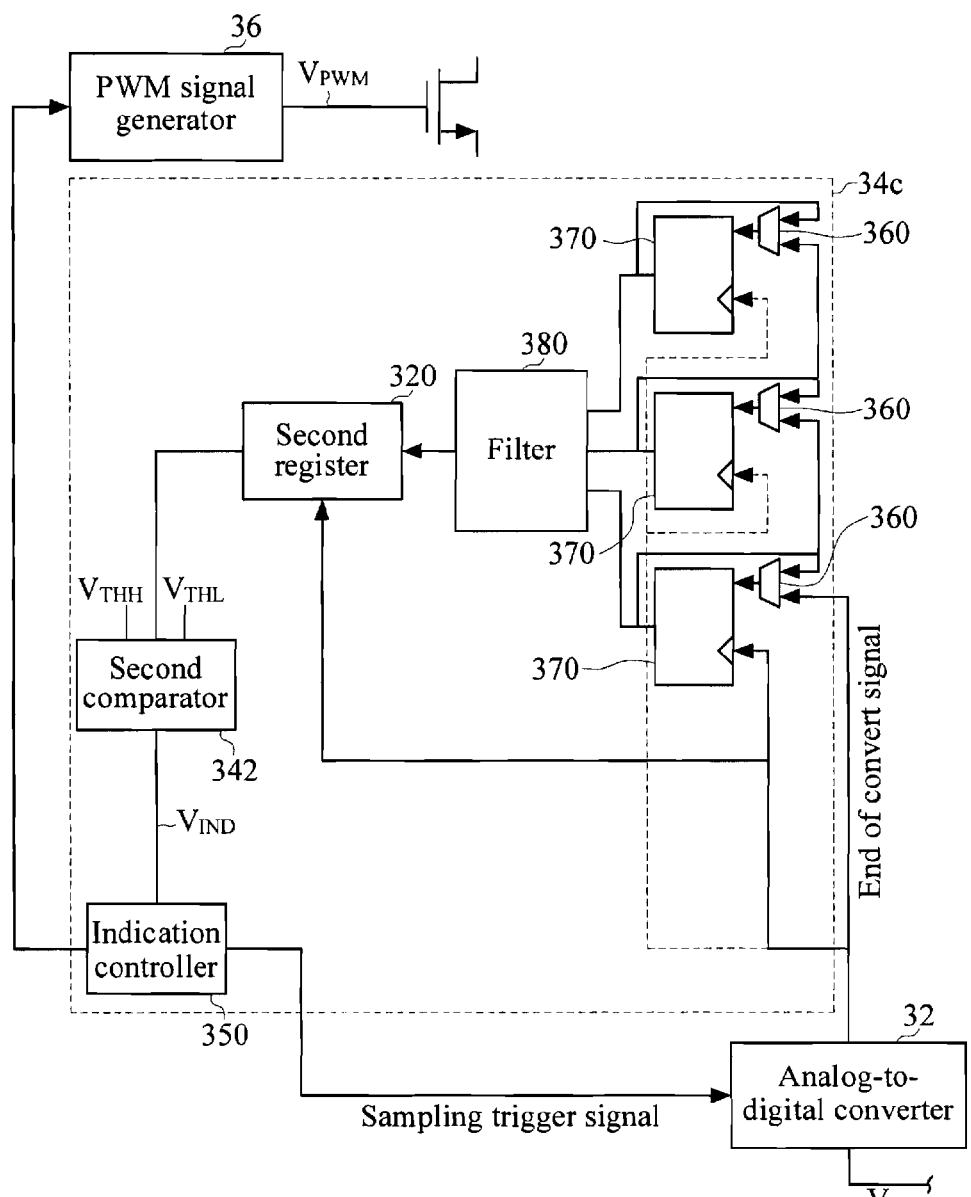
FIG. 3D shows an ASIC according to a fourth embodiment of the present invention.

In addition, in order to increase the data accuracy, the PWM controller 34b further comprises more than one multiplexer 360 and flip-flop 370, and a filter 380. FIG. 3D shows an ASIC according to a fourth embodiment of the present invention. Referring to FIG. 3D, the PWM controller 34c comprises a second register 320, a second comparator 342, an indication controller 350, and a filter 380, multiplexers 360 and flip-flops 370 connected between the second register 320 and the analog-to-digital converter 32.

Figure 3E:
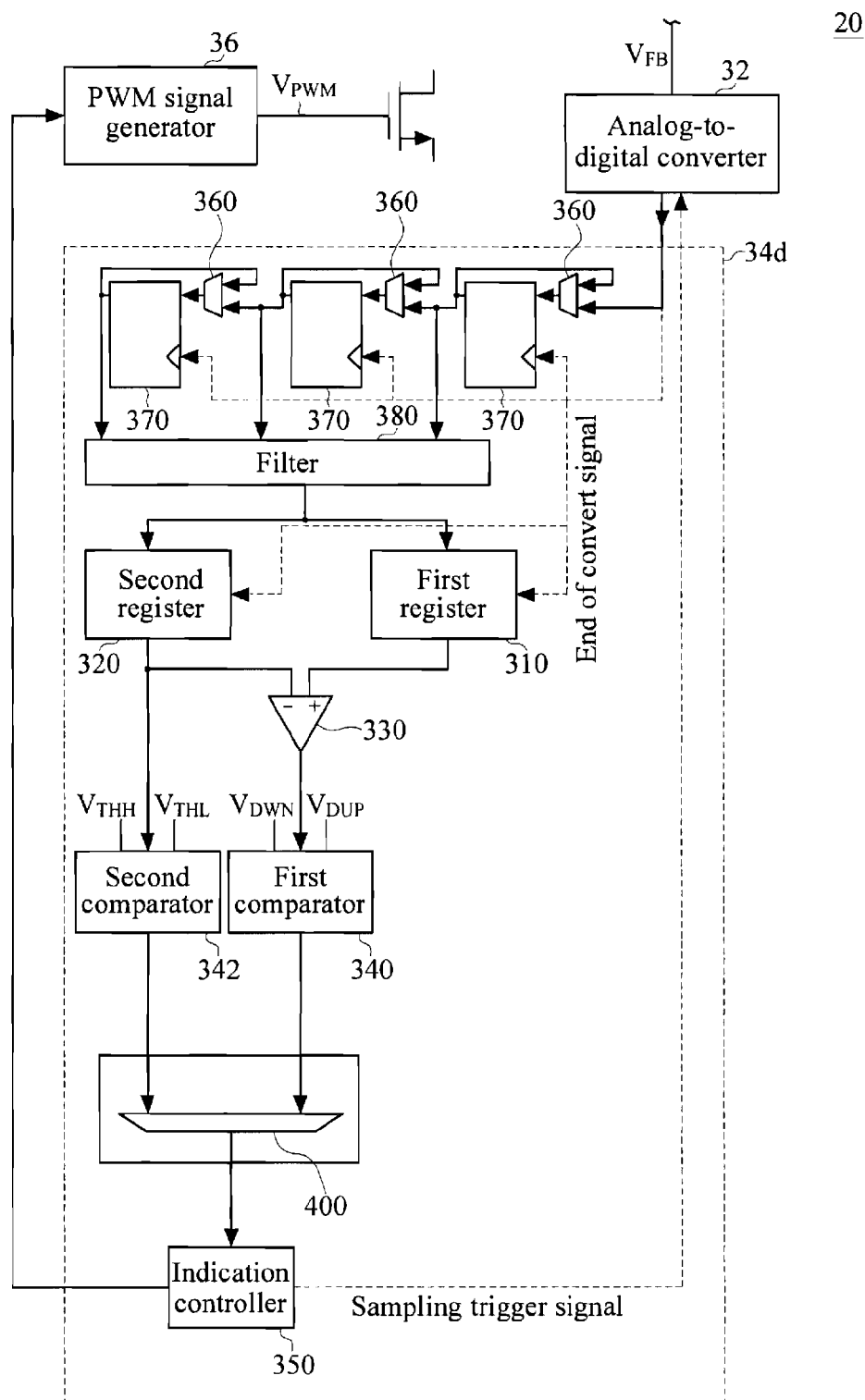
FIG. 3E shows an ASIC according to a fifth embodiment of the present invention.

In addition, according to a fifth embodiment of the present invention, the second embodiment (FIG. 3B) may be combined with the fourth embodiment (FIG. 3D), so as to achieve a preferred embodiment. FIG. 3E shows an ASIC according to the fifth embodiment of the present invention. Referring to FIG. 3E, the sampling principle of the PWM controller 34d is a combination of the second embodiment and the fourth embodiment of the present invention, except that the PWM controller 34d according to this preferred embodiment further comprises a multiplexer 400.

Therefore, in the digital flash charger controller according to the embodiments of present invention, the sensing signal is sampled by the analog-to-digital converter, and according to two algorithms, the pulse positive edge of the PWM signal is enabled to approach the sensing negative edge of the sensing signal, such that the transformer returns to the primary side for charging, thereby achieving a high working efficiency of the digital flash charger controller.

What is claimed is:

1. A digital flash charger controller, configured to charge an energy storage device, the digital flash charger controller comprising:

a transformer, having a primary side and a secondary side, wherein the secondary side is electrically connected to the energy storage device;
a power supply element, for outputting an electric power; and
an application-specific integrated circuit (ASIC), for outputting a pulse-width-modulation (PWM) signal to control whether the electric power is input to the primary side, wherein the PWM signal has a pulse positive edge and a cutoff time, a sensing signal is generated at the secondary side in response to the primary side, the sensing signal has a sensing negative edge, and the ASIC converts the sensing signal to a digital signal, and tracks the sensing negative edge according to the digital signal to adjust the cutoff time, and the next pulse positive edge approaches the corresponding sensing negative edge.

2. The digital flash charger controller according to claim 1, wherein the ASIC comprises:

an analog-to-digital converter, for converting the sensing signal to the digital signal;
a PWM signal generator, for generating the PWM signal according to a working time and the cutoff time, wherein the PWM signal sequentially comprises the pulse positive edge, the working time, a pulse negative edge, and the cutoff time; and
a PWM controller, for obtaining a sample value from the analog-to-digital converter according to a positive edge sampling time, a negative edge sampling time, and the pulse negative edge, and updating the cutoff time and the negative edge sampling time according to the sample value, an upper critical value, and a lower critical value.

3. The digital flash charger controller according to claim 2, wherein the PWM controller obtains a high-level value from the analog-to-digital converter according to the positive edge sampling time and the pulse negative edge, the PWM controller obtains a low-level value from the analog-to-digital converter according to the negative edge sampling time and the pulse negative edge, and the PWM controller uses a difference value between the high-level value and the low-level value as the sample value.

4. The digital flash charger controller according to claim 2, wherein the PWM controller obtains a plurality of high-level values from the analog-to-digital converter according to the positive edge sampling time and the pulse negative edge, the PWM controller obtains a plurality of low-level values from the analog-to-digital converter according to the negative edge sampling time and the pulse negative edge, and the PWM controller uses a difference value between a high-level median value and a low-level median value as the sample value, wherein the high-level median value and the low-level median value are respectively a median of the high-level values and a median of the low-level values.

5. The digital flash charger controller according to claim 2, wherein the PWM controller obtains a low-level value from the analog-to-digital converter according to the negative edge sampling time and the pulse negative edge, and uses the low-level value as the sample value.

6. The digital flash charger controller according to claim 2, wherein the PWM controller obtains a plurality of low-level values from the analog-to-digital converter according to the negative edge sampling time and the pulse negative edge, and uses a low-level median value as the sample value, wherein the low-level median value is a median of the low-level values.

7. The digital flash charger controller according to claim 2, wherein the PWM controller obtains a plurality of high-level values from the analog-to-digital converter according to the positive edge sampling time and the pulse negative edge, the PWM controller obtains a plurality of low-level values from the analog-to-digital converter according to the negative edge sampling time and the pulse negative edge, and the PWM controller further comprises a multiplexer, and selectively uses a differential median value and a low-level median value as the sample value according to the multiplexer, wherein a median of the high-level values is a high-level median value, the low-level median value is a median of the low-level values, and the differential median value is a difference value between the high-level median value and the low-level median value.

* * * * *